INVENTOR.
Helias Doundoulakis
BY Michael S. Striker
Attorney

INVENTOR.
Helias Doundoulakis
BY
Michael S. Striker
Attorney

Aug. 17, 1965 H. DOUNDOULAKIS 3,201,511

SUBSCRIPTION TELEVISION SYSTEM HAVING KEYED GENERATION OF SYRIC SIGNALS AT THE RECEIVER

Filed July 20, 1960 5 Sheets-Sheet 3

INVENTOR.
Helias Doundoulakis
BY
Michael S. Striker
Attorney

INVENTOR.
Helias Doundoulakis
BY
Michael S. Striker
Attorney

INVENTOR.
Helias Doundoulakis
BY
Michael S. Striker
Attorney

United States Patent Office 3,201,511
Patented Aug. 17, 1965

3,201,511

SUBSCRIPTION TELEVISION SYSTEM HAVING KEYED GENERATION OF SYNC SIGNALS AT THE RECEIVER

Helias Doundoulakis, Brooklyn, N.Y., assignor to Teleglobe Pay-TV-System, Inc., New York, N.Y.

Filed July 20, 1960, Ser. No. 44,114
13 Claims. (Cl. 178—5.1)

The present invention relates to a television communication system. More particularly, the invention relates to a television communication system which provides for secret transmission of video and audio signals.

The principal object of the present invention is the provision of a secret television communication system.

An object of the present invention is the provision of a television communication system which may be utilized for normal transmission or for secret transmission.

An object of the present invention is the provision of a secret television communication system providing for line transmission of the audio signal.

Another object of the present invention is the provision of a secret television communication system adapted to utilize existing transmitting and receiving equipment without the necessity of expensive or extensive modification of such equipment.

Another object of the present invention is the provision of a secret television communication system providing for the removal of a selected synch signal before transmission from the transmitter and the reinstatement of the selected synch signal after detection at the receiver.

Another object of the present invention is the provision of a secret television communication system providing for transmission of a video signal without a selected synch signal without disturbing normal transmitter operation.

Another object of the present invention is the provision of a secret television communication system utilizing simple means for providing a video signal for transmission without a selected synch signal.

Another object of the present invention is the provision of a secret television communication system utilizing the suppression of the horizontal synch signal for providing a distorted picture.

Another object of the present invention is the provision of a secret television communication system utilizing simple means for reinstating a non-transmitted selected synch signal.

Another object of the present invention is the provision of a secret television communication system utilizing production of the horizontal synch signals at the receiver for reinstating a distorted picture.

Another object of the present invention is the provision of a secret television communication system providing for reinstatement of a distorted picture without disturbing normal receiver operation.

Another object of the present invention is the provision of a secret television communication system which entails simple connection of the encoding and decoding components to existing equipment with a minimum of inconvenience to the user or subscriber and to the transmitting station.

Another object of the present invention is the provision of a secret television communication system utilizing decoding means connected between the output of the audio detector and the second picture detector in the receiver.

Another object of the present invention is the provision of a secret television communication system utilizing decoding means connected between the antenna and the receiving means of the receiver.

Still another object of the present invention is the provision of a secret television communication system which is reliable and efficient, although of simple structure, in operation.

In accordance with the present invention, the television system comprises transmitting means for transmitting a video signal, the transmitting means including transmitter audio means for simultaneously transmitting an audio signal of a frequency within the audible frequency range synchronized with the video signal. Transmitter encoding means suppresses horizontal synchronizing signals and replaces the horizontal synchronizing signals with a key signal so as to distort the picture. Receiving means receive and reproduce the video signal and the key signal, the receiving means including receiver audio means for receiving and reproducing the audio signal in synchronism with the video signal. Receiver decoding means reconstitutes the horizontal synchronizing signals from the received key signal so as to nullify the effect of the encoding means and provide in the receiving means a video signal including the horizontal synchronizing signals.

In one embodiment of the present invention, the key signal comprises a substantially sinusoidal waveshape and the decoding means comprises wave-shaping means for converting the substantially sinusoidal key signal into horizontal synchronizing pulses, the decoding means having an input connected to a common point between the audio detecting means and the audio signal reproducing means and an output connected to the second picture detecting means of the receiver.

In another embodiment of the present invention, the key signal comprises a substantially sinusoidal waveshape transmitted with an audio signal modulated on an audio signal carrier, and the decoding means comprises means for deriving the key signal from the audio signal carrier, means for deriving the audio signal from the audio signal carrier, waveshaping means for converting the substantially sinusoidal key signal into horizontal synchronizing pulses, means for modulating a received video signal with the horizontal synchronizing pulses to provide a resultant video signal, means for modulating a second audio signal carrier with the derived audio signal to provide a resultant audio signal, and means for applying the resultant video and audio signals to the receiving means; the decoding means having an input connected to the antenna and an output connected to the receiver.

In order that the present invention may be readily carried into effect, it will now be described with reference to the accompanying drawings, wherein.

The circuitry and/or components of any of the blocks shown in FIGS. 3, 4, 5 and 7 is well known in the art and is fully shown and described in any suitable textbook on television or communication engineering, such as, for example, "Principles of Television Engineering" by Donald G. Fink, McGraw-Hill Book Co., Inc., 1940, or "Radio Engineering Handbook," Keith Henney, Editor-in-Chief, 4th Edition, McGraw-Hill Book Co., Inc., 1950, Chapter 19 on Television by Donald G. Fink, pages 995 to 1050.

The geometric fidelity of the reproduction of the picture in a TV system depends upon the exact correspondence in position of the scanning spot at the transmitter and receiver. This correspondence requires that the periodicity and phasing of the horizontal and vertical scanning motions at the two termini, that is, at the transmitter and at the receiver of the television communication system, be alike. Suitable signals are transmitted which indicate the beginning of each frame (or field repetition in the case of interlaced scanning) and the beginning of each line. These synchronizing signals are part of the complete video signal, and occur during time not utilized by the picture signal itself, that is, during the interval in which the scanning spot is returning to its original position, after completing a line or field transversal. In terms of the frequency spectrum of the picture signal, the frequency components are multiples of line and frame frequency, their phase and amplitude being such that they have no effect on the picture except around the edges where they form a narrow border which cannot be used for the image and which, in cathode ray terminal tubes, has no real existence.

Scanning in the case of electronic terminal tubes is produced by deflecting an electron stream periodically in two mutually perpendicular directions by means of suitably varying magnetic or electrostatic fields. The current or voltage producing these fields is supplied from two deflection generators, one operating at line frequency, the other at frame or field frequency. Each generator is controlled by its own synchronizing impulse; therefore, the complete signal must include two types which can be distinguished from one another by some form of selector circuit. It is usual to make the generator producing the synchronizing impulses at the transmitter the fundamental timing unit of the entire system. Thus, the synchronizing signal governs not only the scanning pattern at the reproducer, but also that at the pickup as well. The exact shape of the impulses for horizontal and vertical synchronizing depends upon how the signal is applied at the deflection generator and upon the circuits which separate the two components. Experience has prompted the almost universal adoption of synchronizing impulses which are "blacker than black"; that is, the blanking level corresponds to black in the video signal and the impulses extend below this level in the direction of black.

Figure 1:
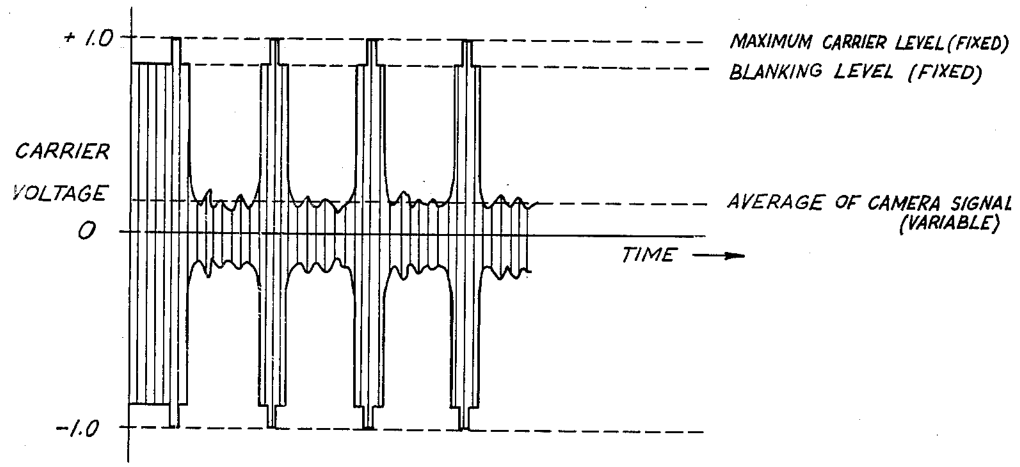
FIG. 1 is a graphical presentation of a modulated TV carrier signal clearly indicating the horizontal synchronizing pulses.
Figure 2:
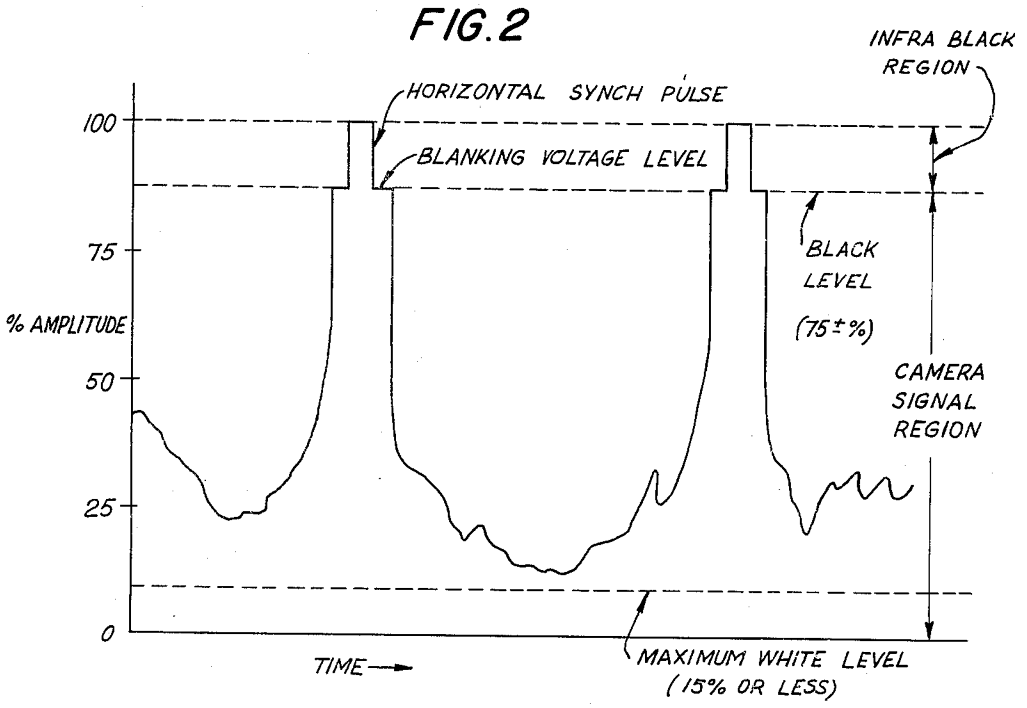
FIG. 2 is a graphical presentation of the details of the modulation envelope of a TV carrier signal clearly indicating the horizontal synchronizing pulses.

The standard form of horizontal synchronizing pulse is shown in FIGS. 1 and 2. The function of the horizontal synchronizing pulses is to trigger an oscillator in order to bring the electron beam from the right-hand side of the screen to the left-hand side. Once the beam is on the left-hand side, the oscillator is no longer directly under the control of a pulse and goes about its usual function of sweeping the beam across the screen. Thus, each horizontal synchronizing pulse that precedes the line detail sets up the beam in readiness for the scanning out of this information. The next pulse arrives when the beam is at the far right-hand side of the screen, at the very end of the line. In similar manner, the vertical pulses serve the purpose of bringing the electron beam back to the top of the screen for the beginning of each field. The construction of the video signal is clearly shown with its synchronizing pulses in FIGS. 1 and 2. In FIGS. 1 and 2, several lines of an image are shown complete with the detailed information, blanking voltages, and horizontal synchronizing pulses. The blanking and synchronizing voltages occupy approximately 20% to 25% of the total signal amplitude. Notice that he blanking voltage retains its control over the cathode ray tube grid for some time before and after each horizontal synchronizing pulse. This is done to make certain that no beam retrace is visible at all on the screen. As soon as the blanking voltage retains control of the grid, the line detail becomes active once more. All the lines of one field follow this form, the only difference occurring in the camera detail of the various sections of the image. At the end of the last horizontal line it is necessary to insert a vertical impulse that will bring the beam back to the top of the screen again. During the period that the vertical pulse is active, it is imperative that the horizontal oscillator should not be neglected. For, should this occur, the horizontal generator probably would slip out of synchronization. To avoid this occurrence, the horizontal synchronizing impulses are sent with the vertical pulse.

When the video signal is imposed on a carrier wave, the envelope of the modulated carrier wave constitutes the video signal wave form. Such a modulated picture carrier and the details of the envelope are shown in FIG. 1. In the FCC standard video signal, as shown in FIGS. 1 and 2, the carrier amplitude is divided by the blank level (blanking level or pedestal) at 75±2.5% of the maximum amplitude. The amplitude region above the black level is called the infrablack region and is occupied by the synchronizing signals. Signal levels in this region do not produce light in the received image. The synchronizing signals are of two types: horizontal signals for initiating the motion of the scanning agent along each horizontal line, and vertical signals (not shown in the figures) for initiating the motion of the scanning agent vertically at the beginning of each field. The peak amplitude of the wave, the height of the synchronizing pulses, and the black level amplitude are maintained constant throughout each broadcast. The portion of the carrier envelope extending below the black level is called the camera signal. The polarity of transmission in the FCC standard is negative; that is, an increase in the light on the camera plate results, for example, in a decrease in the carrier amplitude as shown in FIGS. 1 and 2. The maximum white level is 15% or less of the maximum carrier amplitude. Intermediate grey tones exist between the maximum white level and the black level.

Figure 3:
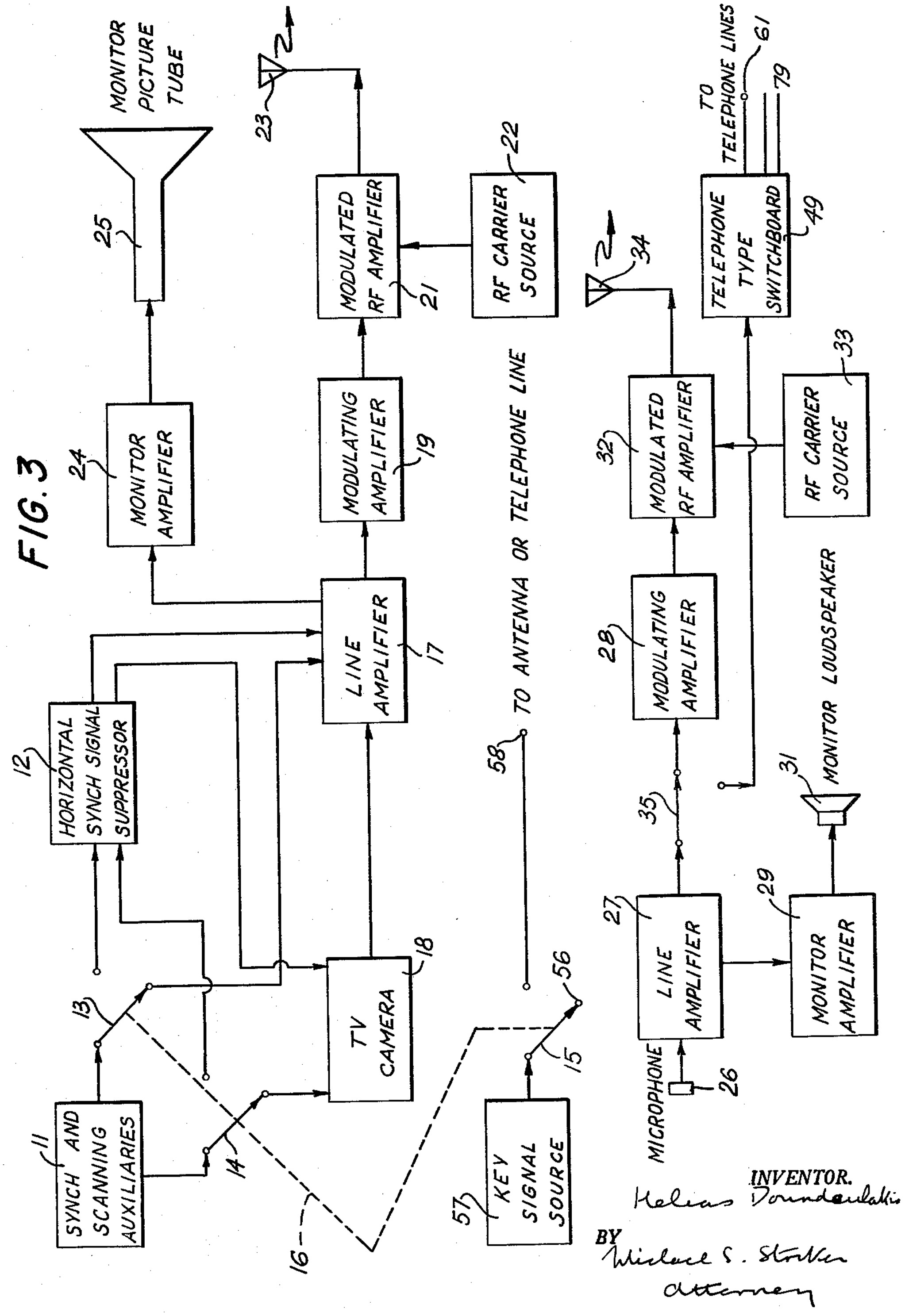
FIG. 3 is a schematic circuit block diagram of an embodiment of a transmitting station of the television communication system of the present invention.

In FIG. 3, synch and scanning auxiliaries 11 produces an output which comprises horizontal and veritcal synchronizing signals. The horizontal synchronizing signals produced by the synch and scanning auxiliaries 11 are suppressed in a horizontal synch signal suppressor 12, when so desired, by switch means comprising first and second armatures 13 and 14, respectively. The switch means comprises, besides the first and second armatures 13 and 14, a third armature 15, all three armatures being ganged, as indicated by the dotted lines 16, so that they operate in unison and so that each is in one of two positions at one time and each is in the other of the two positions at another time.

Thus, during normal transmission of the video signal, without picture distortion, the first armature 13 is moved by manual operation of the switch means to a position whereby the synch and scanning auxiliaries 11 is directly connected to a line amplifier 17. The second armature 14 of the switch means is, when the first armature 13 connects the synch and scanning auxiliaries 11 to the line amplifier 17, in a position wherein it connects said synch and scanning auxiliaries to a TV camera 18. Thus, the video signal produced by the line amplifier 17 is amplified by a modulating amplifier 19 and is modulated by a modulated RF amplifier 21 on a suitable carrier produced by an RF carrier source 22 and the modulated video signal is then transmitted by means of antenna 23. During the normal transmission of a normal video signal the horizontal synch signal suppressor 12 is not connected into the transmitting circuit and does not affect its normal operation.

A monitor amplifier 24 produces an output which is fed to a monitor picture tube 25 which reproduces the picture seen by the TV camera 18, which picture is presumably reproduced at the receiver.

A microphone 26 picks up sound and produces an output which is fed to a line amplifier 27. The line amplifier 27 produces an audio signal which is fed to a modulating amplifier 28 and to a monitor amplifier 29. The output of the monitor amplifier 29 is fed to a monitor loudspeaker 31 which reproduces the sound picked up by the microphone and which is presumably reproduced by the loudspeaker at the receiver. The modulating amplifier 28 produces an audio signal which is fed to a modulated RF amplifier 32 which receives a carrier from an RF carrier source 33 and which modulates said carrier with said audio signal. The modulated audio signal is then transmitted through an antenna 34. The line amplifier 27 is connected to the modulating amplifier 28 through switch means 35 which, during normal transmission, is in the position shown in FIG. 3, thereby permitting said line amplifier to be directly connected to said modulating amplifier so that the audio signal is transmitted through the antenna 34.

Figure 4:
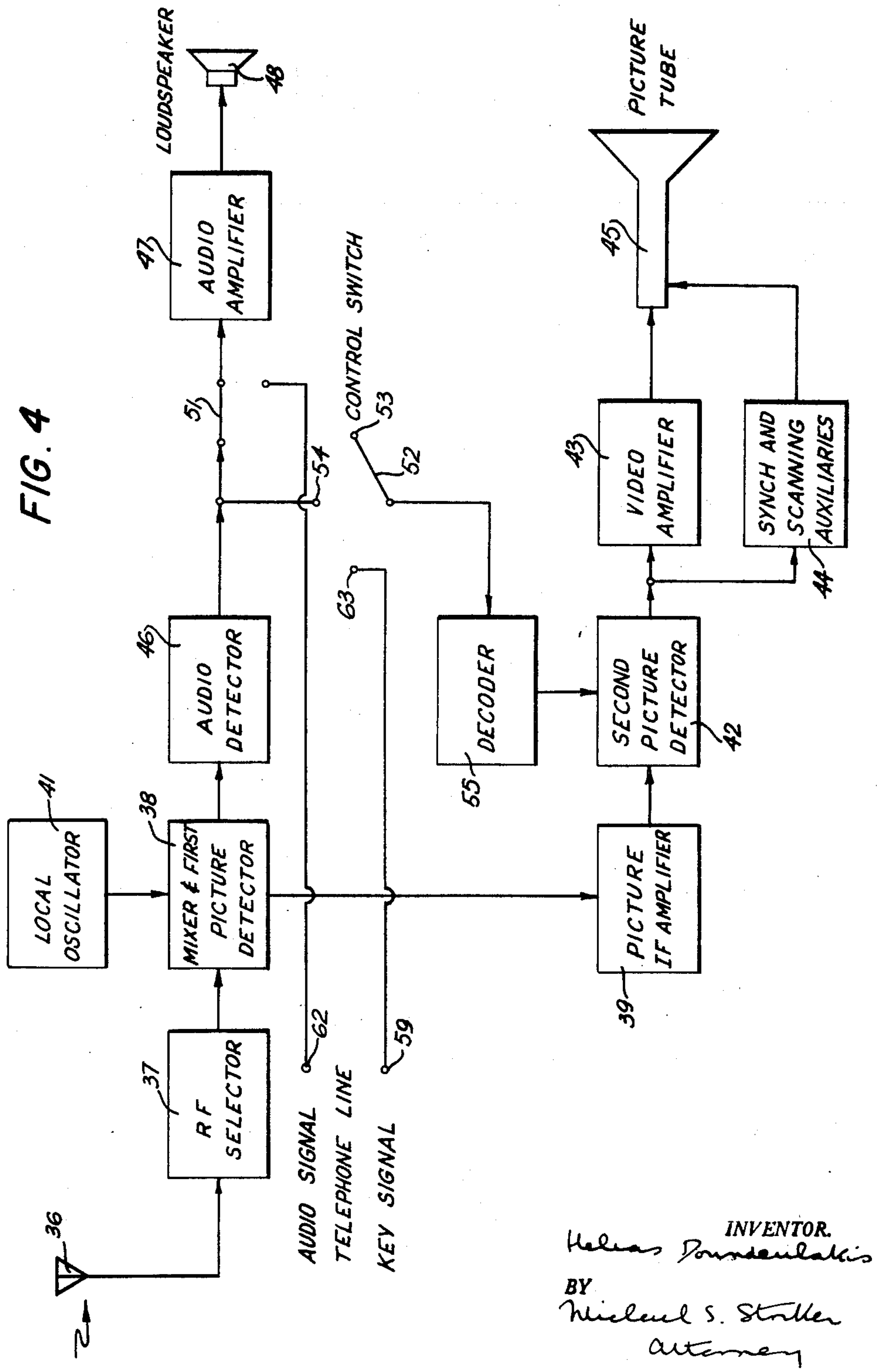
FIG. 4 is a schematic circuit block diagram of an embodiment of a receiving station of the television communication system of the present invention.
Figure 5:
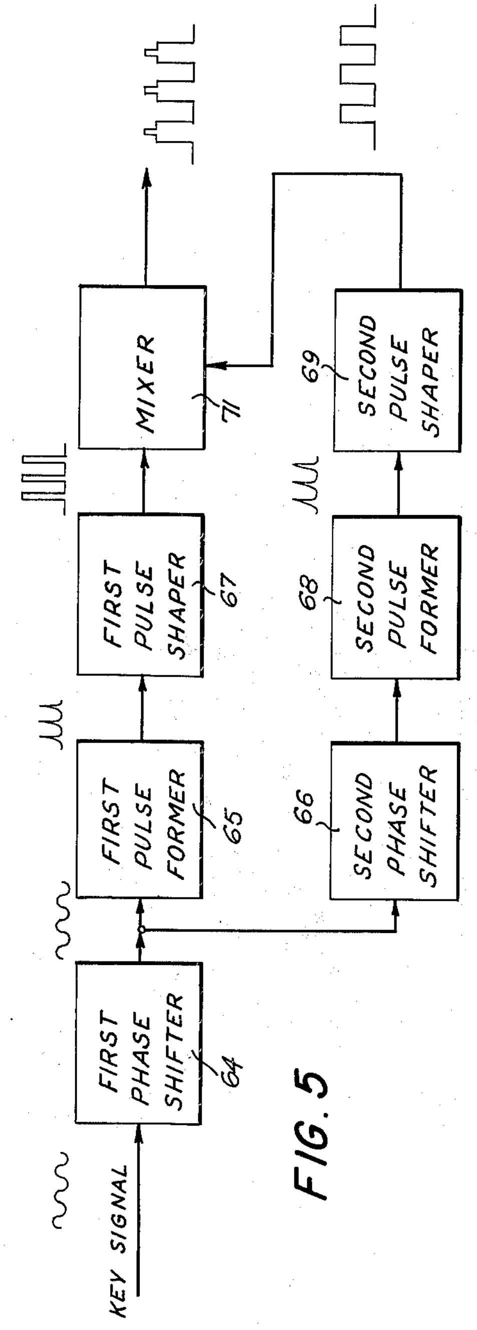
FIG. 5 is a schematic circuit block diagram of an embodiment of decoding means which may be utilized in the embodiment of FIG. 4.

The video signal transmitted by the antenna 23 and the audio signal transmitted by the antenna 34, of the transmitting station of FIG. 3 are received by an antenna 36 of the receiving station of FIG. 4 and are applied to an RF selector 37 which provides an output to a mixer and first picture detector 38. The mixer and first picture detector 38 separates the video and audio signals and applies the video signal to a picture IF amplifier 39. The mixer function is aided by a local oscillator 41 which feeds the mixer and first picture detector 38. The output of the picture IF amplifier 39 is fed to a second picture detector 42. The output of the second picture detector 42 is fed to a video amplifier 43 and to synch and scanning auxiliaries 44 directly. Thus, during normal transmission operation of the system, the video amplifier 43 produces an output which is fed to a picture tube 45 of the receiver which reproduces the picture seen by the TV camera 18 of the transmitting station due to the control of said picture tube by the synch and scanning signals produced by the synch and scanning auxiliaries 44.

During normal transmission the audio output of the mixer and first picture detector 38 is fed to an audio detector 46 which produces an output which is fed to an audio amplifier 47. The audio amplifier 47 then feeds a loudspeaker 48 which reproduces the sound originally picked up by the microphone 26 of the transmitter station and transmitted by carrier from the antenna 34 of the transmitting station to the antenna 36 of the receiving station.

Thus, during normal operation of the system of the present invention a video signal containing horizontal and vertical synchronizing pulses or signals and an audio signal will be produced in the usual manner, transmitted in the usual manner and received and reproduced in the usual manner, as described in the aforementioned texts, so that during normal operation of the system of the present invention a normal TV transmission and reception takes place. However, the secret television communication system of the present invention is especially adapted for use as a confidential or closed-type system. The system of the present invention is also adapted for home subscriber programming, and in order to provide such operation the switch means at the transmitting station and the switch means at the receiving station are put into operation.

If a closed-type or subscriber-type system is desired, wherein a subscriber wishes to receive a program which is not available to non-subscribers, the subscriber may indicate by phone call or other suitable means, such as, for example, by dialing a code number, that he wishes to receive a special program. Suitable means may be provided at his receiver for indicating payment for his subscription, such as, for example, a receptacle for coins, tokens, punched cards, etc. The means for payment of the subscription may, by suitable means, also be utilized to notify the transmitting station that the subscriber is ready to receive the special program.

In accordance with the present invention, a selected subscriber, who may be one of several hundreds of thousands of such subscribers and who wishes to view special closed circuit television programs on occasion, is connected and/or has his receiver connected by telephone communicating type lines directly to a telephone type switchboard 49, shown in FIG. 3 in schematic form. Thus, each of the subscribers may have his receiver directly connected to a line identified with him which is fed to a telephone type switchboard 49. The switchboard 49 preferably comprises an automatic telephone type switchboard such as produced by the General Telephone Co. and which functions to provide desired line connections at desired times in the manner of known automatic switchboards. Thus, if a subscriber wishes to receive a special program for which he will pay or be billed, he has merely to call in a signal to the switchboard 49 or to close a suitable manual switch, such as, for example, a switch 51 (which is then moved to its position other than that shown in FIG. 4) at his set to said switchboard which will alert the switchboard that such reception is desired. Of course, he may indicate in some other suitable manner that he is desirous of receiving a subscription program.

The operation of the switch means at the transmitting station insures that the subscribers receive the program transmitted on a closed circuit basis. Thus, when a special program is to be transmitted, the transmitter control operator will initiate the transmission by operation of the transmitter control or transmitter switch means. The switchboard 49 is aware that identified subscribers are ready to receive the special program and have paid their required subscription fees or have been accordingly billed in suitable manner, since it has been alerted by signals from the subscribers' receivers. Such alerting signals may have been provided directly by coin receiving means or punched card means available at the receiver of the subscriber. At any rate, when the special program is to be transmitted, the operator of the transmitting station operates the switch means to move the first armature 13 to the other position from that shown in FIG. 3, to move the second armature 14 to the other position from that shown in FIG. 3, and to move the third armature 15 to the other position from that shown in FIG. 3 and thereby institute the closed circuit secret television communication system in accordance with the objective of the present invention.

At the time that the subscriber closes the switch 51 to the switchboard 49 to advise the switchboard that he wishes to receive the audio signals which may be transmitted over the telephone lines by means of the telephone system including the telephone type switchboard 49, he may also operate a control switch 52 from a blank terminal 53, which is contacted by said switch during normal transmission, to a first subscription terminal 54 which connects a decoder 55 into the circuit. Of course, either or both of the switches 51 and 52 may be closed by the coin or punch card machine at the receiver of the subscriber. Furthermore, either or both of the switches 51 and 52 may be operated by relay means energized by a control signal received through the switchboard means 49 from the transmitter, or sent to the receiver in any suitable manner.

When the first armature 13 is moved to its other position from that shown in FIG. 3 and when the second armature 14 is moved to its other position, from that shown in FIG. 3, they apply the output of the synch and scanning auxiliaries 11 to the horizontal synch signal suppressor 12 which comprises any suitable type of signal suppressor, such as, for example, a filter which will filter out the horizontal synch signals, or a suitable switch means which will switch the horizontal synch signal generator out of the circuit. The output of the horizontal synch signal suppressor 12 is then supplied to the TV camera 18 and to the line amplifier 17 so that a distorted picture is produced due to the lack of horizontal synch signals. The distorted picture, lacking horizontal synch signals, is then transmitted by the antenna 23. Thus, any non-subscriber, whose receiver is in normal condition, will merely see a distorted garble on his screen instead of a picture. Since the first, second and third armatures 13, 14 and 15 are ganged, so that they move together, the manual operation of a master switch of the transmitter control means will cause all three armatures to move in unison.

The third armature 15 will move from a blank terminal 56, which is contacted by said armature during normal transmission, to its other terminal and thereby cause the key signal produced by a key signal source 57 to be supplied either to a selected one of the antennae 23 and 34 or to the switchboard 49, which has a plurality of telephone lines extending therefrom, each of said lines or each group of said lines representing a specific subscriber and leading to the receiver of said subscriber. The key signal then appears at a key signal terminal 58 of the transmitter and is supplied to the subscriber's receiver either through said key signal terminal, the telephone line and a key signal terminal 59 at said receiver, or through the antenna 36 of said receiver, so that the subscriber desiring to receive the special program receives said key signal at his set.

If the audio signal is to be transmitted by telephone line and not through the air, the switch 35 is moved to the other position from that shown in FIG. 3 so that it connects the audio signal produced by the line amplifier 27 directly to the subscriber's receiver through the telephone system comprising the switchboard 49 and telephone lines. The audio signal then appears at the audio terminal 61 at the transmitter and is received at the audio terminal 62 at the receiver, whence it is supplied through the closed switch 51 directly to the audio amplifier 47 of the subscriber's receiver. The audio amplifier 47 produces an output which is fed to the loudspeaker 48 which then reproduces the sound picked up by the microphone 26 at the transmitter. Thus, during transmission of the closed circuit program, all the audio may be transmitted directly by wire, if so desired, so that it cannot be received by non-subscribing receivers and the picture is distorted so that it cannot be reproduced by non-subscribing receivers.

When the key signal at the terminal 58 at the transmitter is to be transmitted by telephone line it is supplied through the switchboard 49 to the subscriber's telephone line and is transmitted through the telephone line and appears at the key terminal 59 at the other end of the telephone line. The key signal is supplied directly to the decoder 55 through the control switch 52, which has been moved to a position in which it contacts a second subscription terminal 63.

When the key signal is transmitted from the antenna 23 with the video signal, or from the antenna 34 with the audio signal, it is received by the antenna 36 of the receiving means and is passed through the RF selector 37 and the mixer and first picture detector 38 to the audio detector 46 which then derives the key signal and supplies it directly to the decoder 55 through the control switch 52 which is positioned in contact with its terminal 54. They key signal may comprise, of course, any suitable frequency and may modulate the audio or video signals, although it is preferably of substantially sinusoidal waveshape. The key signal carrier frequency may lie in either side of the frequency band utilized for video transmission. The key signal preferably has a frequency of 15,750 cycles per second, although it may it may actually be made to vary from a frequency close to but less than 15,750 cycles per second to a frequency close to but greater than 15,750 cycles per second. The permissible wobbling of the key signal frequency permits greater secrecy in the system of the present invention. The transmission of the key signal in sinusoidal form is preferred because if a non-sinusoidal form is utilized a greater bandwidth will be required and greater bandwidth may conflict with the picture video signal.

In one embodiment of the present invention, the key signal comprises a substantially sinusoidal waveshape and is transmitted at a predetermined frequency. In another embodiment of the present invention, the key signal comprises a substantially sinusoidal waveshape transmitted as an audio frequency modulated on the audio signal carrier.

Figure 6:
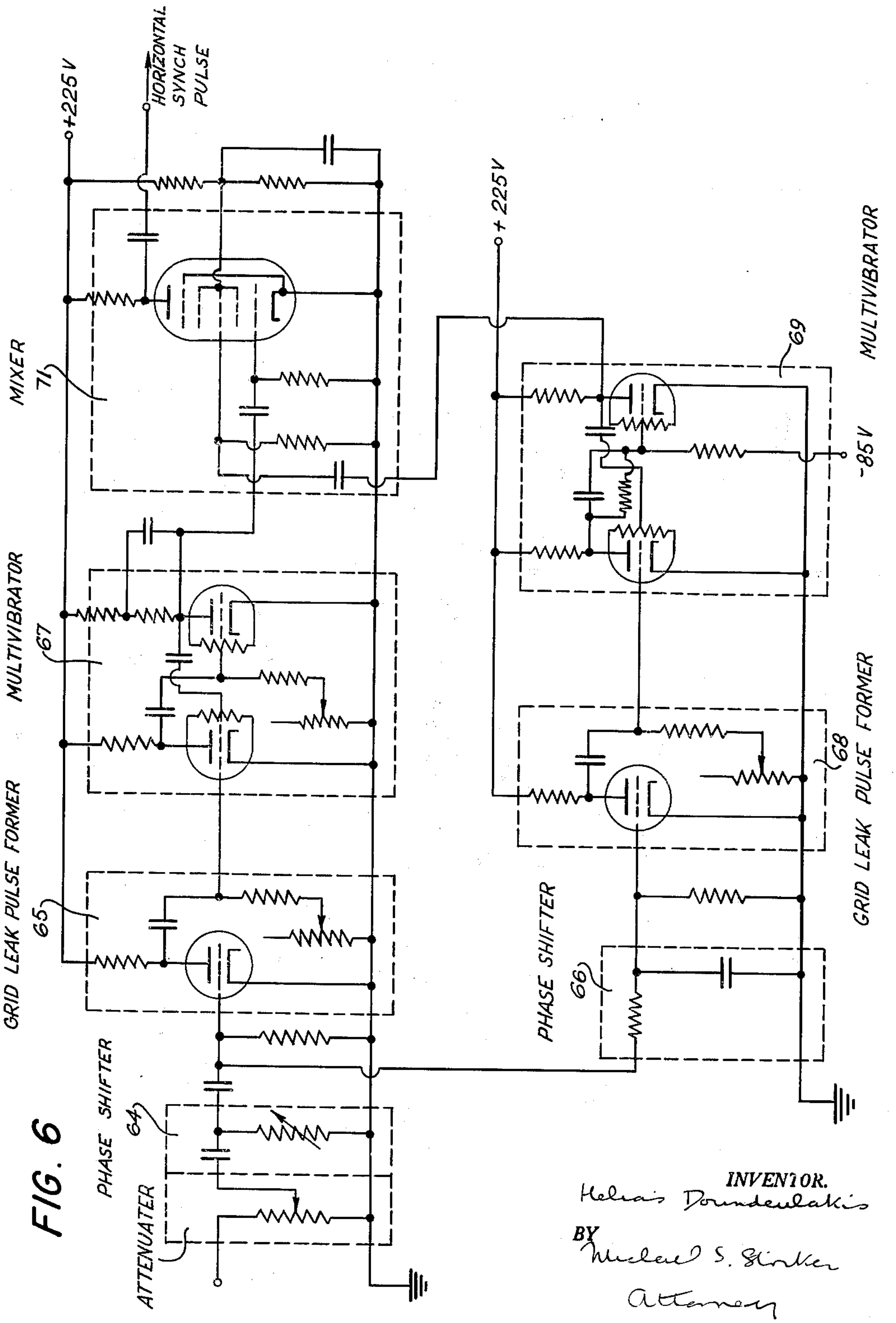
FIG. 6 is a schematic circuit diagram of an embodiment of the decoding means of FIG. 5.

Thus, when the key signal is transmitted through the air and received by the antenna 36, the input of the decoder 55 is connected between a common point between the output of the audio detector 46 and the input of the audio amplifier 47 and the output of said decoder is connected to the second picture detector 42. The decoder 55 comprises suitable means for converting the substantially sinusoidal key signal into horizontal synchronizing pulses. The decoder 55 of the present invention may comprise the system shown in FIG. 5, wherein the key signal of substantially sinusoidal waveshape is supplied to a first phase shifter 64, which, as shown in FIG. 6, may comprise a simple resistance-capacitance phase shifting network. The first phase shifter 64 is adjusted to shift the incoming key signal to coincide in phase with the vertical synch pulses so that the horizontal synch pulses are coincident or synchronized with the vertical synch pulses. Once the first phase shifter 64 is adjusted for a particular channel it may remain so throughout transmission in such channel. The phase-shifted key signal is then supplied to a first pulse former 65 and to a second phase shifter 66. The first pulse former 65 preferably comprises a grid leak pulse former of the type shown in FIG. 6 and the second phase shifter 66 preferably comprises a simple resistance-capacitance circuit of the type shown in FIG. 6. The first pulse former 65 functions to convert the phase-shifted key signal from substantially sinusoidal waveshape to a first series of substantially sharp pulses. The first series of substantially sharp pulses produced by the first pulse former 65 is then supplied to a first pulse shaper 67, which converts the first series of substantially sharp pulses into a first series of substantially square pulses. The first pulse shaper 67 preferably comprises a multivibrator of the type shown in FIG. 6.

The key signal of substantially sinusoidal waveshape, which has been phase-shifted by the first phase shifter 64 and phase-shifted again by the second phase shifter 66, is then supplied to a second pulse former 68 which functions to convert the substantially sinusoidal key signal into a second series of substantially sharp pulses. The second pulse former 68 may be of similar type as the first pulse former 65 and may comprise a grid leak pulse former of the type shown in FIG. 6. The second series of substantially sharp pulses produced by the second pulse former 68 is then supplied to a second pulse shaper 69 which functions to convert the second series of substantially sharp pulses into a second series of substantially square pulses. The second pulse shaper 69 may be of similar type as the first pulse shaper 67, as is shown in FIG. 6. The substantially square pulses produced by the first and second pulse shapers are designed to differ from each other in duration time and in amplitude so that when both series of pulses are combined they produce a series of horizontal synch signals. Thus each pulse of the first series of substantially square pulses produced by the first pulse shaper 67 is of relatively greater amplitude and relatively shorter duration than that of each pulse of the second series of substantially square pulses. The first series of substantially square pulses is supplied from the first pulse shaper 67 to a mixer 71 and the second series of substantially square pulses is supplied from the second pulse shaper 69 to said mixer. The mixer 71 may comprise any suitable mixer circuit, such as, for example, a pentagrid mixer of suitable type, as shown in FIG. 6, and functions to combine the first and second series of pulses and produce a resultant series of horizontal synchronizing pulses.

The output of the decoder 55, which comprises the horizontal synch signals which were previously suppressed in the transmitter and which were not therefore received at the receiver, is then supplied to the second picture detector 42. The second picture detector 42 functions to combine the horizontal synch pulses with the video signal produced by the picture IF amplifier 39 and to produce a complete video signal comprising the picture information and the horizontal as well as vertical synch pulses. The complete video signal is then supplied to the video amplifier 43 and to the synch and scanning auxiliaries 44 to produce at the picture tube 45 the picture seen by the camera 18 at the transmitter.

When the audio signal is transmitted over the air and is received by the antenna 36, the audio signal produced by the audio detector 46 is fed to the audio amplifier 47 which feeds the loudspeaker 48 to reproduce the audio signal picked up by the microphone 26 at the transmitter. Thus, the subscriber enjoys an accurate reproduction at his receiver of the picture and the audio signal and receives a clear and accurate picture and sound as initially originated at the transmitting station.

Figure 7:
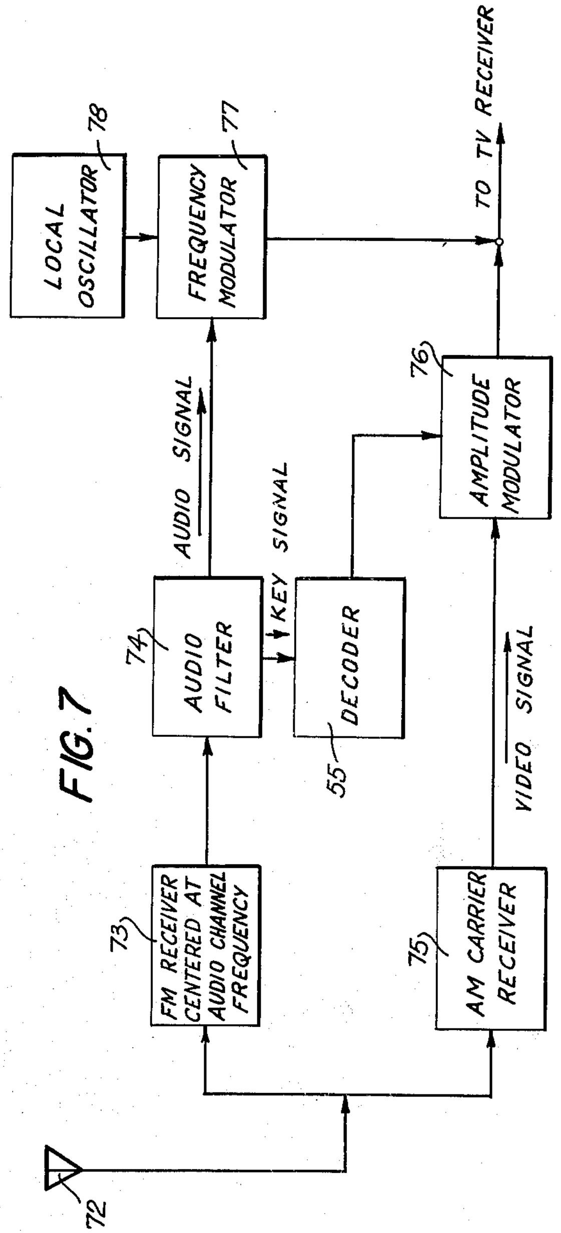
FIG. 7 is a schematic circuit block diagram of another embodiment of decoding means which may be utilized in the communication system of the present invention.

FIG. 7 shows another embodiment of decoding means which may be utilized in the television communication system of the present invention. In the embodiment of FIG. 7, the key signal comprises a substantially sinusoidal waveshape transmitted with an audio signal modulated on an audio signal carrier. The audio signal and the key signal may be transmitted either by air and received by an antenna 72, or may be transmitted through a telephone system including a switchboard and telephone lines, as described with reference to the preceding figures, in which case it will be directly applied to the same point at which the antenna 72 connects to the rest of the circuit. The audio signal and the key signal are received by the antenna 72 and are supplied to an FM receiver 73 which is centered at the audio channel frequency. The FM receiver 73 may comprise any suitable type of FM receiver, such as described in the aforementioned textbooks, and serves to derive from the received signal the audio and key signals. The audio and key signals derived from the received signal by the FM receiver 73 are then supplied to an audio filter 74 which derives the substantially sinusoidal key signal from the audio signal carrier and which derives the audio signal from the audio signal carrier. The key signal derived from the audio signal carrier by the audio filter 74 is then supplied to the decoder 55 which comprises the circuit arrangement of FIGS. 5 and 6 and which functions in the described manner to convert the substantially sinusoidal key signal into horizontal synchronizing pulses of substantially square waveshape. The horizontal synch pulses produced by the decoder 55 are then combined with the output of an AM carrier receiver 75 which functions to derive the video signal from the signal received by the antenna 72. The video signal produced by the AM carrier receiver 75 and the horizontal synch pulses produced by the decoder 55 are combined in an amplitude modulator 76 which functions to combine said signals by modulating the video signal with the horizontal synch signal to produce a complete video signal at its output. The complete video signal produced by the amplitude modulator 76 is then combined with the audio signal and is applied to a TV receiver. The audio signal produced by the audio filter 74 is supplied to a frequency modulator 77 which is fed by a local oscillator 78 so that the frequency modulated audio signal, complete as initially transmitted, is reproduced. The frequency modulated audio signal produced by the frequency modulator 77 is combined with the video signal produced by the amplitude modulator 76 and the combined resultant signal is fed to the TV receiving set. It is thus seen that the converting means which comprises the entire circuit arrangement of the embodiment of FIG. 7 may be connected between the antenna 72 and the entire receiver set of the subscriber.

The frequency modulator 77 serves to modulate a second audio signal carrier provided by the local oscillator 78 with the derived audio signal from the audio filter 74 to produce the resultant audio signal which is applied with the resultant video signal to the receiving set.

When the subscriber wishes to subscribe to a program he may do so by dialing a predetermined code number on his telephone thereby communicating with the automatic type switchboard 49 and alerting said switchboard to the fact that his control and audio circuit should be closed or are closed. Of course, a human operator such as a telephone operator may be utilized instead of the automatic switchboard but it is preferred to use automatic telephone switchboards to handle the huge volume of subscribers that may require service at any time.

It is thus seen that the television communication system of the present invention provides security for video and audio transmission to subscribers. Although for the purposes of clarity of illustration and clarity of disclosure a single receiving station is indicated in FIG. 4, it is realized, of course, that a plurality of receiving stations are connected to a transmitting station through the telephone type switchboard 49 and through a plurality of telephone lines as indicated by the extra telephone lines 79 indicated in FIG. 3. Each of the receiving stations may comprise the receiving means indicated in FIG. 4. Of course, several hundred thousand receiving sets may be included in the system, each of which will include the components of FIG. 4; the great number of receiving sets being accommodated through the automatic switchboard means 49.

It is thus seen that the transmitting station is not disrupted from its normal operation due to the inclusion of the horizontal synch signal suppressor 12 or the control or switch means utilized for the communication system of the present invention, and that the receivers are not disrupted from normal operation due to the inclusion of the decoder 55 or the key signal converter including such decoder and the control switches 52 and/or 51. The transmitting and receiving means do not require reconstruction to enable transmission and reception of subscription programs, and neither the owners of TV sets nor the transmitter operator are inconvenienced by the structure or operation of the subscription system. The modifications of existing equipment required for the subinstallable standard type equipment. The utilization of telephone lines for the audio transmission during the subscription, if desired, makes the use of the communication system of the present invention exceedingly simple, although reliable and efficient and permits direct communication with each subscriber through the central point such as indicated by the switchboard 49. The switchboard 49 and the telephone lines are part of the telephone system which may already be in existence and which may be leased or purchased or utilized in the closed circuit TV system of the present invention.

From the foregoing it will be clear that the present invention comprises not only a secret television communication system, but a method for secret television communication. The method of the present invention comprises, in one embodiment, the steps of transmitting from a transmitting station a wireless video signal and an audio signal of af requency within the audible frequency range synchronized with the video signal. The method of the present invention of the first embodiment further includes suppressing horizontal synchronizing signals and replacing the horizontal synchronizing signals with a key signal so as to distort the picture; receiving and reproducing at a receiving station the key signal, the video signal and the audio signal in synchronism with the video signal; and reconstituting the horizontal synchronizing signals from the received key signal so as to provide in the receiving station a video signal including the horizontal synchronizing signals.

In another embodiment, the method of the present invention comprises the steps of suppressing horizontal synchronizing signals and replacing the horizontal synchronizing signals with a key signal of substantially sinusoidal waveshape modulated on an audio signal carrier so as to distort the picture; receiving at a receiving station the video signal and the audio signal in synchronism with the video signal; deriving the key signal from the audio signal carrier; deriving the audio signal from the audio signal carrier; converting the key signal into horizontal synchronizing pulses; modulating the video signal with the horizontal synchronizing pulses to provide a resultant video signal; modulating a second audio signal carrier with the derived audio signal to produce a resultant audio signal; and applying the resultant video and audio signals to picture and audio reproducing means at the receiving station.

It is obvious, of course, that the key signal may be transmitted at any desired frequency in the high or low frequency range of a standard TV channel, either directly or modulated either in an FM or AM manner so long as it does not interfere with the video or audio signals. The key signal is transmitted as a continuous frequency, utilizing part of the available channel bandwidth; the frequency, phase and relative amplitude of the horizontal synchronizing pulses being indicated thereby. When the audio signal is transmitted by telephone line, the FM portion of the channel bandwidth may be utilized for the transmission of the horizontal synch frequency. The key signal may, however, be transmitted by any suitable frequency.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a television receiver, in combination, receiving means for receiving and reproducing a video signal and a key signal of substantially sinusoidal waveshape, said receiving means including picture detecting means for deriving the picture signal from a received video signal, means connected to said picture detecting means for reproducing a picture from the output of said picture detecting means, synchronizing and scanning means connected to said picture reproducing means, and receiver audio means for receiving and reproducing an audio signal in synchronism with said video signal, said receiver audio means comprising audio detecting means for deriving said audio signal from the received signal and means for reproducing said audio signal from the output of said audio detecting means; and decoding means for producing horizontal synchronizing signals from the received key signal so as to provide in said receiver a video signal including said horizontal synchronizing signals, said decoding means having an input connected to a common point between said audio detecting means and said audio signal reproducing means and an output connected to said picture detecting means and comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses, and mixing means for combining said first and second series of substantially square pulses to provide a resultant series of horizontal synchronizing pulses.

2. In a television receiver, in combination, receiving means for receiving and reproducing a video signal and a key signal of substantially sinusoidal waveshape, said receiving means including picture detecting means for deriving the picture signal from a received video signal, means connected to said picture detecting means for reproducing a picture from the output of said picture detecting means, synchronizing and scanning means connected to said picture reproducing means, and receiver audio means for receiving and reproducing an audio signal in synchronism with said video signal, said receiver audio means comprising audio detecting means for deriving said audio signal from the received signal and means for reproducing said audio signal from the output of said audio detecting means; and decoding means for producing horizontal synchronizing signals from the received key signal so as to provide in said receiver a video signal including said horizontal synchronizing signals, said decoding means having an input connected to a common point between said audio detecting means and said audio signal reproducing means and an output connected to said picture detecting means and comprising first phase shifting and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substantially sharp pulses, said second phase shifting and pulse forming means comprising a resistance-capacitance circuit followed by a grid leak pulse former, second pulse shaping means for converting said second series of substantially sharp pulses into a second series of substantially square pulses, said second pulse shaping means comprising a multivibrator, and mixing means for combining said first and second series of substantially square pulses to provide a resultant series of horizontal synchronizing pulses, said mixing means comprising a multigrid electron tube.

3. In a television receiver, in combination, receiving means for receiving and reproducing a video signal and a key signal comprising a substantially sinusoidal waveshape transmitted with an audio signal modulated on an audio signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and decoding means for producing horizontal synchronizing signals from the received key signal so as to provide in said receiver a video signal including said horizontal synchronizing signals, said decoding means having an input connected to said antenna means and an output connected to said receiving means and comprising means for deriving said substantially sinusoidal key signal from said audio signal carrier, means for deriving said audio signal from said audio signal carrier, waveshaping means for converting said substantially sinusoidal key signal into horizontal synchronizing pulses, means for modulating a received video signal with said horizontal synchronizing pulses to provide a resultant video signal, means for modulating a second audio signal carrier with said derived audio signal to provide a resultant audio signal, and means for applying said resultant video and audio signals to said receiving means.

4. In a television receiver, in combination, receiving means for receiving and reproducing a video signal and a key signal comprising a substantially sinusoidal waveshape transmitted with an audio signal modulated on an audio signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and decoding means for producing horizontal synchronizing signals from the received key signal so as to provide in said receiver a video signal including said horizontal synchronizing signals, said decoding means having an input connected to said antenna means and an output connected to said receiving means and comprising means for deriving said substantially sinusoidal key signal from said audio signal carrier, means for deriving said audio signal from said audio signal carrier, waveshaping means for converting said substantially sinusoidal key signal into horizontal synchronizing pulses, means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

5. In a television receiver, in combination, receiving means for receiving and reproducing a video signal and a key signal comprising a substantially sinusoidal waveshape transmitted with an audio signal modulated on an audio signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied in said receiving means; and decoding means for producing horizontal synchronizing signals from the received key signal so as to provide in said receiver a video signal including said horizontal synchronizing signals, said decoding means having an input connected to said antenna means and an output connected to said receiving means and comprising means for deriving said substantially sinusoidal key signal from said audio signal carrier, means for deriving said audio signal from said audio signal carrier, waveshaping means for converting said substantially sinusoidal key signal into horizontal synchronizing pulses, said waveshaping means comprising means for converting said substantially sinuosidal key signal into a series of substantially sharp pulses and means for converting said series of substantially sharp pulses into a series of substantially square horizontal synchronizing pulses, means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

6. In a television receiver, in combination receiving means for receiving and reproducing a video signal and a key signal comprising a substantially sinusoidal waveshape transmitted with an audio signal modulated on an audio signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and decoding means for producing horizontal synchronizing signals from the received key signal so as to provide in said receiver a video signal including said horizontal synchronizing signals, said decoding means having an input connected to said antenna means and an output connected to said receiving means and comprising means for deriving said substantially sinusoidal key signal from said audio signal carrier, means for deriving said audio signal from said audio signal carrier, waveshaping means for converting said substantially sinusoidal key signal into horizontal synchronizing pulses, said waveshaping means comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses, and mixing means for combining said first and second series of substantially square pulses to provide a resultant series of horizontal synchronizing pulses, means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

7. In a television receiver, in combination receiving means for receiving and reproducing a video signal and a key signal comprising a substantially sinusoidal waveshape transmitted with an audio signal modulated on an audio signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and decoding means for producing horizontal synchronizing signals from the received key signal so as to provide in said receiver a video signal including said horizontal synchronizing signals, said decoding means having an input connected to said antenna means and an output connected to said receiving means and comprising means for deriving said substantially sinusoidal key signal from said audio signal carrier, means for deriving said audio signal from said audio signal carrier, waveshaping means for converting said substantially sinusoidal key signal into horizontal synchronizing pulses, said waveshaping means comprising first phase shifting and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substantially sharp pulses, said second phase shifting and pulse forming means comprising a resistance-capacitance circuit followed by a grid leak pulse former, second pulse shaping means for converting said second series of substantially sharp pulses into a second series of substantially square pulses, said second pulse shaping mean comprising a multivibrator, and mixing means for combining said first and second series of substantially square pulse to provide a resultant series of horizontal synchronizing pulses, and mixing means comprising a multigrid electron tube, means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

8. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal of substantially sinusoidal waveshape so as to distort the picture; receiving means for receiving and reproducing said video signal and said key signal, said receiving means including picture detecting means for deriving the picture signal from the received video signal, means connected to said picture detecting means for reproducing a picture from the output of said picture detecting means, synchronizing and scanning means connected to said picture reproducing means, and receiver audio means for receiving and reproducing an audio signal in synchronism with said video signal, said receiver audio means comprising audio detecting means for deriving said audio signal from the received signal and means for reproducing said audio signal from the output of said audio detecting means; and receiver decoding means for reconstituting horizontal synchronizing signals from the received key signal so as to nullify the effect of said encoding means and provide in said receiving means a video signal including horizontal synchronizing signals, said decoding means having an input connected to a common point between said audio detecting means and said audio signal reproducing means and an output connected to said picture detecting means and comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses, and mixing means for combining said first and second series of substantially square pulses to provide a resultant series of horizontal synchronizing pulses.

9. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal of substantially sinusoidal waveshape so as to distort the picture; receiving means for receiving and reproducing said video signal and said key signal, said receiving means including picture detecting means for deriving the picture signal from the receiving video signal, means connected to said picture detecting means for reproducing a picture from the output of said picture detecting means, synchronizing and scanning means connected to said picture reproducing means, and receiver audio means for receiving and reproducing an audio signal in synchronism with said video signal, said receiver audio means comprising audio detecting means for deriving said audio signal from the received signal and means for reproducing said audio signal from the output of said audio detecting means; and receiver decoding means for reconstituting horizontal synchronizing signals from the received key signal so as to nullify the effect of said encoding means and provide in said receiving means a video signal including said horizontal synchronizing signals, decoding means having an input connected to a common point between said audio detecting means and said audio signal reproducing means and an output connected to said picture detecting means and comprising first phase shifting and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substantially sharp pulses, said second phase shifting and pulse forming means comprising a resistance-capacitance circuit followed by a grid leak pulse former, second pulse shaping means for converting said second series of substantially sharp pulses into a second series of substantially square pulses, said second pulse shaping means comprising a multivibrator, and mixing means for combining said first and second series of substantially square pulses to provide a resultant series of horizontal synchronizing pulses, and mixing means comprising a multigrid electron tube.

10. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to disort the picture, said key signal comprising a substantially sinusoidal waveshape transmitted with said audio signal modulated on an audio signal carrier; receiving means for receiving and reproducing said video signal and said key signal, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting horizontal synchronizing signals from the received key signal so as to nullify the effect of said encoding means and provide in said receiving means a video signal including horizontal synchronizing signals, said decoding means having an input connected to said antenna means and an output connected to said receiving means and comprising means for deriving said substantially sinusoidal key signal from said audio signal carrier, means for deriving said audio signal from said audio signal carrier, waveshaping means for converting said substantially sinusoidal key signal into horizontal synchronizing pulses, means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

11. In a televison system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to distort the picture, said key signal comprising a substantially sinusoidal waveshape transmitted with said audio signal modulated on an audio signal carrier; receiving means for receiving and reproducing said video signal and said key signal, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting horizontal synchronizing signals from the received key signal so as to nullify the effect of said encoding means and provide in said receiving means a video signal including horizontal synchronizing signals, said decoding means having an input connected to said antenna means and an output connected to said receiving means and comprising means for deriving said substantially sinusoidal key signal from said audio signal carrier, means for deriving said audio signal from said audio signal carrier, waveshaping means for converting said substantially sinusoidal key signal into horizontal synchronizing pulses, said waveshaping means comprising means for converting said substantially sinusoidal key signal into a series of substantially sharp pulses and means for converting said series of substantially sharp pulses into a series of substantially square horizontal synchronizing pulses, means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

12. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to distort the picture, said key signal comprising a substantially sinusoidal waveshape transmitted with said audio signal modulated on an audio signal carrier; receiving means for receiving and reproducing said video signal and said key signal, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting horizontal synchronizing signals from the received key signal so as to nullify the effect of said encoding means and provide in said receiving means a video signal including said horizontal synchronizing signals, decoding means having an input connected to said antenna means and an output connected to said receiving means and comprising means for deriving said substantially sinusoidal key signal from said audio signal carrier, means for deriving said audio signal from said audio signal carrier, waveshaping means for converting said substantially sinusoidal key signal into horizontal synchronizing pulses, said waveshaping means comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses to provide a resultant series of horizontal synchronizing pulses means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

13. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to distort the picture, said key signal comprising a substantially sinusoidal waveshape transmitted with said audio signal modulated on an audio signal carrier; receiving means for receiving and reproducing said video signal and said key signal, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting horizontal synchronizing signals from the received key signal so as to nullify the effect of said encoding means and provide in said receiving means a video signal including said horizontal synchronizing signals, decoding means having an input connected to said antenna means and an output conected to said receiving means and comprising means for deriving said substantially sinusoidal key signal from said audio signal carrier, means for deriving said audio signal from said audio signal carrier, waveshaping means for converting said substantially sinusoidal key signal into horizontal synchronizing pulses, said waveshaping means comprising first phase shitfing and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substantially sharp pulses, said second phase shifting and pulse forming means comprising a resistance-capacitance circuit followed by a grid leak pulse former, second pulse shaping means for converting said second series of substantially sharp pulses into a second series of substantially square pulses, said second pulse shaping means comprising a multivibrator, and mixing means for combining said first and second series of substantially square pulses to provide a resultant series of horizontal synchronizing pulses, said mixing means comprising a multigrid electron tube, means for amplitude modulating a received video signal with said horizontal synchronizing pulses to provide a resultant video signal, means for frequency modulating a second audio signal carrier with said derived audio signal to provide a resultant audio signal, and means for applying said resultant video and audio signals to said receiving means.

References Cited by the Examiner

UNITED STATES PATENTS

| | | | |
|---|---|---|---|
| 2,510,046 | 5/50 | Ellett | 178—5.1 |
| 2,705,740 | 4/55 | Druz | 178—5.1 |
| 2,770,671 | 11/56 | Ellett | 178—5.1 |
| 3,001,011 | 9/61 | Weiss | 178—5.1 |

DAVID G. REDINBAUGH, *Primary Examiner.*

NEWTON N. LOVEWELL, ROY LAKE, *Examiners.*